(12) United States Patent
Mueller et al.

(10) Patent No.: US 9,556,986 B2
(45) Date of Patent: Jan. 31, 2017

(54) DIELECTRIC FITTING ASSEMBLY

(75) Inventors: Carsten Heinrich Mueller, Stuhr (DE); Mark James Fahey, Mosgiel (NZ)

(73) Assignee: Parker-Hannifin GmbH, Bielefeld (DE)

( * ) Notice: Subject to any disclaimer, the term of this patent is extended or adjusted under 35 U.S.C. 154(b) by 601 days.

(21) Appl. No.: 13/697,941

(22) PCT Filed: May 3, 2011

(86) PCT No.: PCT/EP2011/057059
§ 371 (c)(1),
(2), (4) Date: Dec. 4, 2012

(87) PCT Pub. No.: WO2011/144440
PCT Pub. Date: Nov. 24, 2011

(65) Prior Publication Data
US 2013/0076018 A1    Mar. 28, 2013

Related U.S. Application Data

(60) Provisional application No. 61/345,178, filed on May 17, 2010.

(51) Int. Cl.
*F16L 25/03* (2006.01)
*B64D 37/00* (2006.01)
*B64D 37/32* (2006.01)
*B64D 45/02* (2006.01)

(52) U.S. Cl.
CPC .............. *F16L 25/03* (2013.01); *B64D 37/005* (2013.01); *B64D 37/32* (2013.01); *B64D 45/02* (2013.01)

(58) Field of Classification Search
CPC .................................... F16L 9/10; F16L 25/03

USPC .................. 285/45, 47, 53, 55, 290.1, 290.3
See application file for complete search history.

(56) References Cited

U.S. PATENT DOCUMENTS

| | | |
|---|---|---|
| 3,432,186 A | 3/1969 | Braun |
| 3,433,882 A | 3/1969 | Henriksen et al. |
| 3,454,287 A | 7/1969 | Thiessen |
| 3,462,175 A | 8/1969 | Johnson |
| 3,686,747 A | 8/1972 | Bagnulo |
| 3,705,735 A | 12/1972 | Davidson et al. |
| 3,861,719 A | 1/1975 | Hand |
| 3,862,771 A | 1/1975 | Schwarz |

(Continued)

FOREIGN PATENT DOCUMENTS

| | | |
|---|---|---|
| DE | 2702925 A1 | 7/1978 |
| EP | 1156254 A1 | 11/2001 |

(Continued)

OTHER PUBLICATIONS

PCT International Search Report, International Application No. PCT/EP2011/057059, International filing date: May 3, 2011.

*Primary Examiner* — David E Bochna
(74) *Attorney, Agent, or Firm* — Renner, Otto, Boiselle & Sklar, LLP (57) ABSTRACT

A dielectric fitting (10, 10', 110) assembly includes a hose (14, 114) connected between two end fittings (12, 121, 112), and a structural reinforcement portion having at least an inner layer (26, 26',126) formed of a first composite material having a high strength and a second composite material having a high electrical resistance. The first and second composite materials cover the assembly and provide a smooth transition of radial stiffness as the inner layer transitions from a high strength portion to a high electrically resistant portion.

18 Claims, 7 Drawing Sheets

(56) References Cited

U.S. PATENT DOCUMENTS

| | | | |
|---|---|---|---|
| 3,871,687 A | 3/1975 | Dockree | |
| 3,989,280 A | 11/1976 | Schwarz | |
| 4,011,652 A | 3/1977 | Black | |
| 4,066,283 A | 1/1978 | Struck | |
| 4,234,368 A | 11/1980 | Schwartz | |
| 4,398,754 A | 8/1983 | Caroleo et al. | |
| 4,522,889 A | 6/1985 | Ebneth et al. | |
| 4,614,369 A | 9/1986 | Overath et al. | |
| 4,630,789 A | 12/1986 | Rosenberg | |
| 4,824,147 A | 4/1989 | De Gruijter | |
| 4,861,074 A | 8/1989 | Eastlund et al. | |
| 5,131,688 A | 7/1992 | Tricini | |
| 5,280,965 A | 1/1994 | Schwarz | |
| 5,664,809 A | 9/1997 | Bates | |
| 6,575,243 B2 | 6/2003 | Pabst | |
| 6,722,440 B2 | 4/2004 | Turner et al. | |
| 7,326,015 B2 | 2/2008 | Reynolds, Jr. | |
| 2006/0099843 A1 | 5/2006 | Fullner et al. | |
| 2007/0145190 A1 | 6/2007 | Villegas et al. | |
| 2008/0169643 A1 | 7/2008 | Marban et al. | |
| 2009/0071676 A1 | 3/2009 | Vieira | |
| 2010/0003840 A1 | 1/2010 | Breay et al. | |
| 2010/0116941 A1 | 5/2010 | Ciolcyzk et al. | |

FOREIGN PATENT DOCUMENTS

| | | |
|---|---|---|
| GB | 769886 | 3/1957 |
| GB | 901991 | 7/1962 |
| GB | 1150047 | 4/1969 |
| GB | 1503722 | 3/1978 |
| GB | 1505067 | 3/1978 |
| GB | 1523801 | 9/1978 |
| WO | 2006049956 A1 | 5/2006 |
| WO | 2009035344 A2 | 3/2009 |
| WO | 2010044930 A2 | 4/2010 |

DIELECTRIC FITTING ASSEMBLY

CROSS REFERENCE TO RELATED APPLICATIONS

The present application claims the benefit of the filing date of U.S. Provisional Patent Application Ser. No. 61/345,178, filed May 17, 2010, the disclosure of which is incorporated herein by reference in its entirety.

TECHNICAL FIELD

The present invention relates to a dielectric fitting assembly and more particularly, to a dielectric fitting assembly for use as a fluid conduit.

BACKGROUND

Dielectric fitting assemblies are known in the art and have found use in many applications, ranging from natural gas pipelines, where they isolate monitoring instruments from the effects of electrical current and interrupt cathodic current flow while permitting fluid flow, to providing a conduit for transferring liquid through an aircraft bulkhead. In the latter usage, the dielectric fitting assembly includes fitting connections located on both sides of the aircraft bulkhead that permit connections of tubes, hoses, or other fluid-carrying components between them. Such a dielectric fitting assembly also provides a high electrical resistance path that limits electrical current flow between the two fitting connections but allows for the gradual dissipation of a precipitation-static (p-static) charge. If the fluid flowing through the dielectric fitting assembly has conductive properties that allow it to dissipate a static charge, the dielectric fitting assembly will need to provide only a very high electrical resistance approaching that of a non-conductor.

Thus, when used in an aircraft, a primary function of a dielectric fitting assembly is to dissipate the electrical energy from static charges caused in part by fluid movements and the indirect effects of lightning, at such an occurrence. These fitting assemblies have the equally important function of providing a safe fluid passage for the fluid passing through the fuel tank or other areas of the aircraft.

Figure 7:
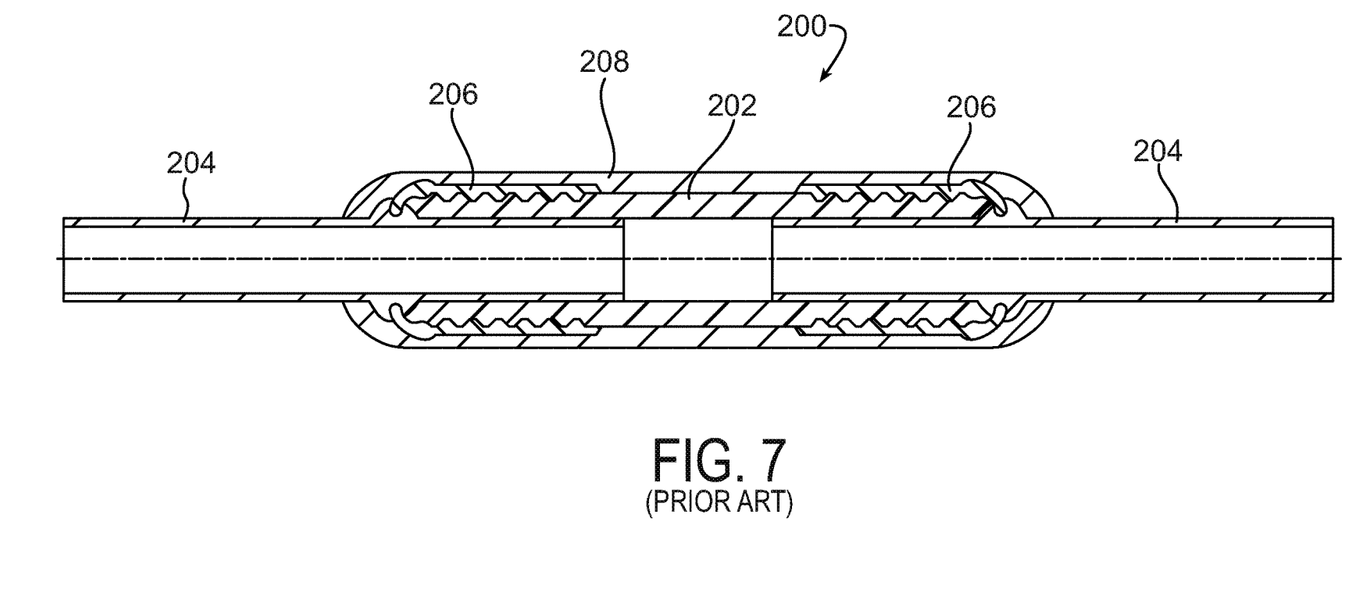
FIG. 7 illustrates a known dielectric fitting assembly.

One such dielectric fitting assembly is disclosed in US-A-2008/0169643, which is incorporated herein in its entirety. This dielectric fitting assembly is shown in FIG. 7. The dielectric fitting assembly 200 of FIG. 7 includes a non-metallic hose 202 extending between two spaced apart metallic tubular end-fittings 204. The ends of the hose 202 are fastened to the end-fittings 204 by a metallic socket 206 that is crimped over the hose. The hose 202 has an electrically conductive inner layer that provides a specified electrical resistance and thereby, permits the dissipation of an electrostatic charge. The non-metallic hose 202 is described as being reinforced. A dielectric cover 208 surrounds the hose 202.

SUMMARY OF THE INVENTION

At least one embodiment of the invention provides a dielectric fitting assembly comprising: an assembly including a hose connected between two end fittings; and a structural reinforcement portion having at least an inner layer formed of at least different first and second composite materials, the first composite material having a high strength relative to the second composite material and the second composite material having a high electrical resistance relative to the first composite material, the first and second composite materials covering the assembly and providing a smooth transition of radial stiffness as the inner layer transitions from a high strength portion to a high electrically resistant portion.

A dielectric fitting assembly comprising: an assembly including a hose connected between two end fittings, each end of the hose connected to the fittings by a crimped socket; and a structural reinforcement portion having at least an inner layer and an outer layer, the inner layer formed of at least different first and second composite materials, the first composite material having a high strength relative to the second composite material and the second composite material having a high electrical resistance relative to the first composite material, the first composite material surrounding the socket of each fitting and extending axially toward the other fitting, the second composite material surrounding the first composite material and surrounding the hose at least between the axially extending portions of the first composite material, the outer layer formed of non-conductive fibres.

A dielectric fitting assembly comprising: an assembly including a hose connected between two end fittings, each end of the hose connected to the fittings by a crimped socket; and a structural reinforcement portion having at least an inner layer and an outer layer, the inner layer formed of carbon fibre reinforced plastic and glass fibre reinforced plastic, the carbon fibre reinforced plastic surrounding the socket of each fitting and extending axially toward the other fitting, the glass fibre reinforced plastic material surrounding the carbon fibre reinforced plastic and surrounding the hose at least between the axially extending portions of the glass fibre reinforced plastic, in which the axially extending portions of the carbon fibre reinforced plastic are positioned bending radially outward from a longitudinal axis of the fitting as the portions extend axially from each socket.

BRIEF DESCRIPTION OF THE DRAWINGS

Embodiments of this invention will now be described in further detail with reference to the accompanying drawings, in which.

DESCRIPTION OF THE INVENTION

Figure 1:
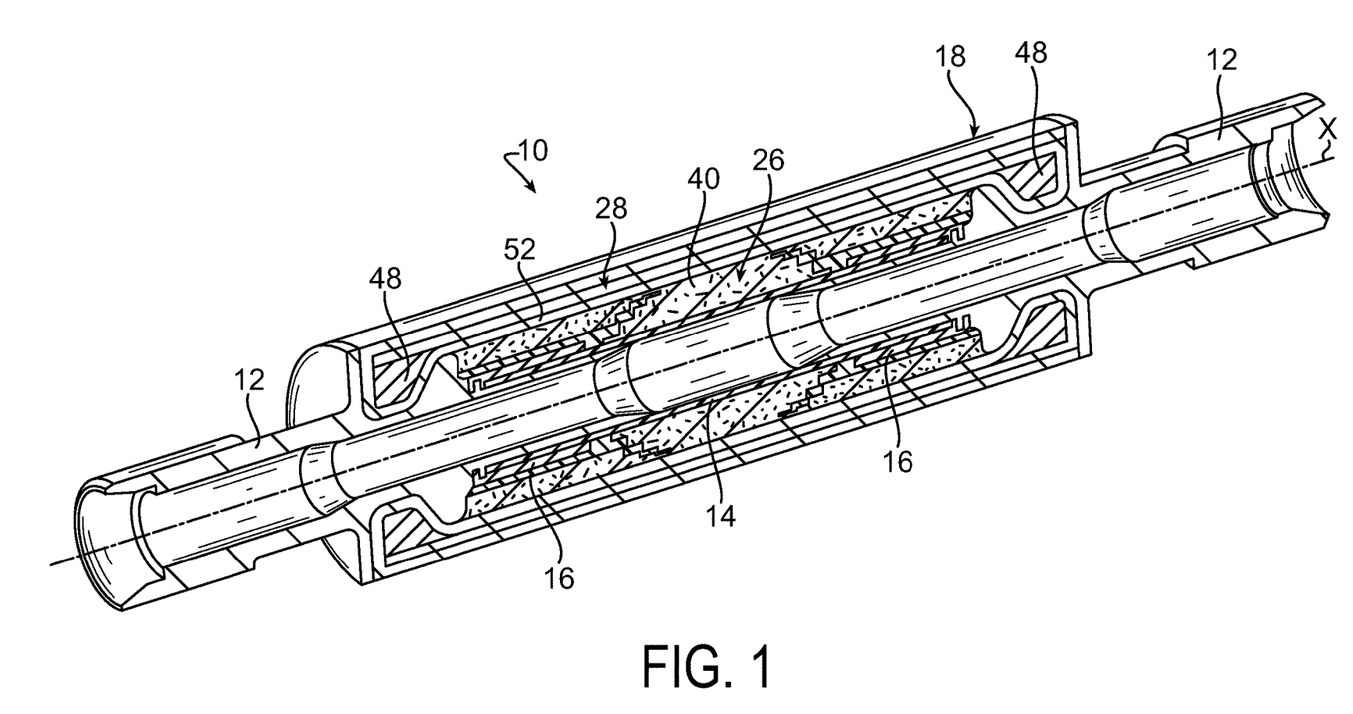
FIG. 1 is a perspective cutaway view of a dielectric fitting assembly constructed in accordance with an embodiment of the invention.
Figure 2:
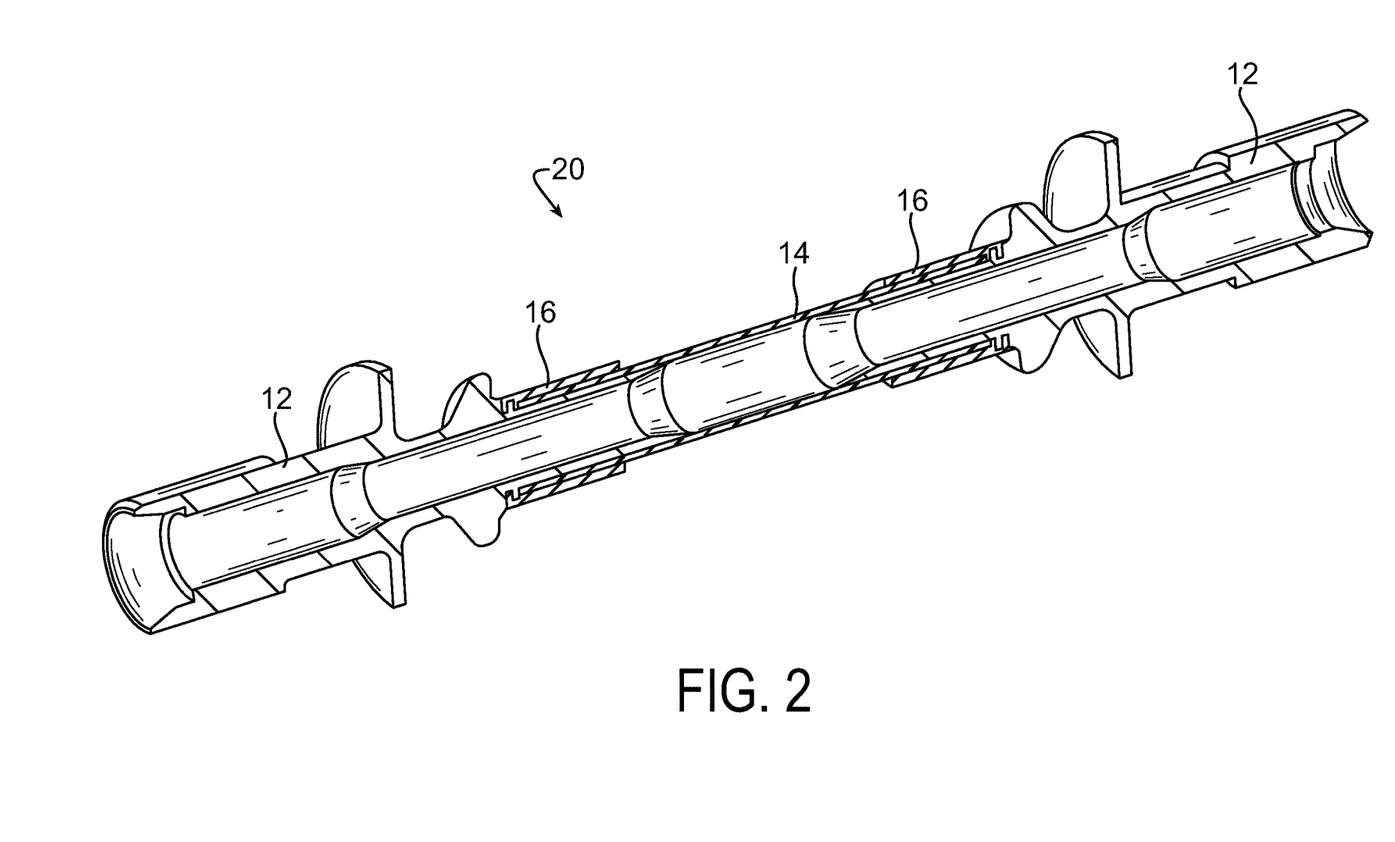
FIG. 2 is a perspective cutaway view of a crimped assembly of the dielectric fitting assembly of FIG. 1.

FIG. 1 illustrates a dielectric fitting assembly, otherwise referred to as a highly resistive unit or HRU 10, constructed in accordance with the present invention. The HRU 10 is an assembly comprising at least two end-fittings 12, a hose section 14, sockets 16, and a structural reinforcement portion 18. In the present invention, the hose section 14 need not itself be reinforced. In the illustrated embodiment, the hose section 14 is not reinforced. The sub-assembly of the end-fittings 12, the hose section 14, and sockets 16 is collectively called the crimped assembly 20. FIG. 2 illustrates a perspective cut-away view of the crimped assembly 20. As can be seen with reference to FIG. 2, the hose section 14 is received on an end of each end-fitting 12 and is secured in place by an associated socket 16 in a known manner.

In the embodiment illustrated in FIG. 1, the structural reinforcement portion 18 includes an inner layer 26 and an outer layer 28. The inner and outer layers 26 and 28 of the structural reinforcement portion are formed of composite materials. Composite material refers to a material that consists of a constituent material surrounded by a matrix material, often fibres surrounded by a polymer matrix. In one embodiment, a glass fibre reinforced plastic (GFRP) is used as it is chemically stable and non-conductive, but other fibres, for example, carbon, aramid or PBO (poly p-phenylene-2,6-bezobisoxazole), to name a few, may also be used if other properties are desired. The polymer matrix may be a thermoset resin, for example, epoxy, polyester, or a thermoplastic. The function of the structural reinforcement portion 18 of the HRU 10 is to allow the crimped assembly 20 to withstand loading both radially, from an internal pressure and axially, while simultaneously tolerating a very high electrical potential difference between the two metallic end-fittings 12 caused, for example, by lightning.

Figure 3:
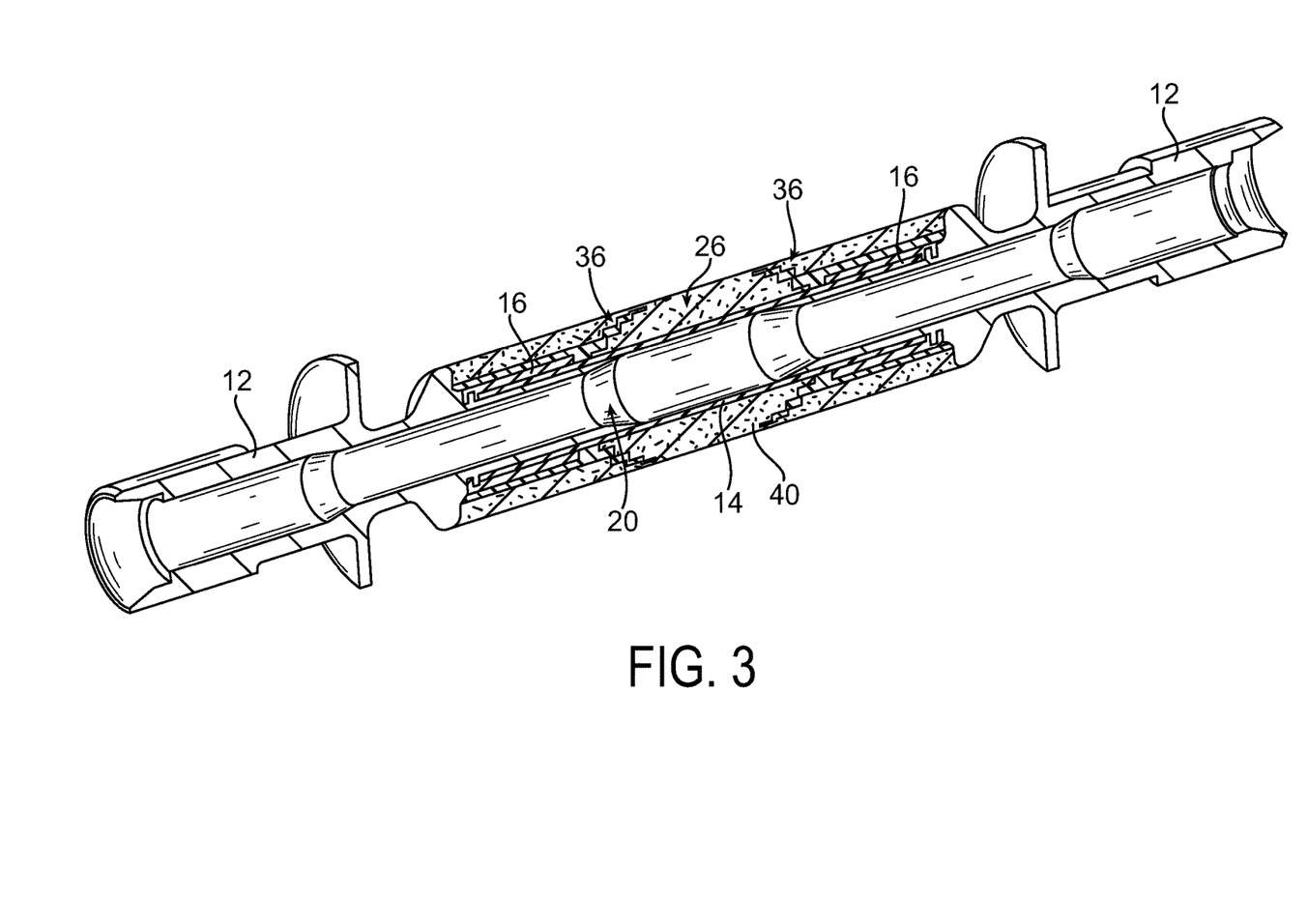
FIG. 3 is a perspective cutaway view of an inner reinforcement layer applied to the crimped assembly of FIG. 2.

There are multiple methods by which the composite material may be formed into the layers and applied to the crimped assembly 20, for example, prepeg winding, tape laying, filament winding, wrapping, and resin transfer moulding. A key parameter in the application of the composite material is the orientation of the fibres in the layers. The inner layer 26 is formed by laying composite material about the hose section 14 and sockets 16 using one of the above methods or other methods available from time to time for laying the fibres. FIG. 3 is a perspective cut-away view of the inner layer 26 applied to the crimped assembly 20. In one embodiment, the fibres of the inner layer 26 are oriented circumferentially with respect to a central, longitudinal axis X (FIG. 1) of the HRU 10. In one embodiment, the fibres of the inner layer 26 are oriented at an angle between sixty and ninety degrees relative to the longitudinal axis X. In another embodiment, the fibres of the inner layer 26 are oriented at an angle between seventy-five and ninety degrees relative to the longitudinal axis X. The inner layer 26 primarily supports the hose section 14 when subjected to internal pressure and thereby, limits the radial deflection of the hose section 14. As a secondary effect, the inner layer 26 provides support to the sockets 16, helping to ensure that the connection between the hose section 14 and the end-fittings 12 remains sealed and intact.

Figure 6A:
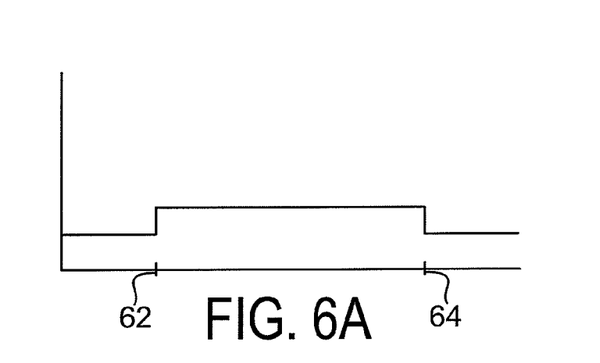
FIGS. 6A-6D are graphs illustrating radial deflection for a predetermined load over the axial length of various dielectric fitting assemblies.

One challenge of forming the inner layer 26 from a composite material is minimizing abrupt changes in radial displacement over the axial length of the HRU 10. An abrupt change in radial displacement provides a location in which the inner layer 26 is under high amounts of stress when subjected to internal pressures. If not minimized, this localized stress may result in a failure of the HRU 10 at the locations of the abrupt change in radial displacement. The HRU 10 of the present invention is designed to avoid abrupt changes in radial displacement along its axial length. For example, FIG. 6A is a graph of radial displacement for a predetermined load (Y-axis) over the axial length (X-axis) of a known dielectric fitting assembly having a hose section with a braided wire reinforced covering that extends between its end fittings. Dashes 62 and 64 on the X-axis mark the transition between the respective end fittings and the hose section having the braided wire reinforced covering adjacent the inner edge of the fittings. As can be seen from the graph of FIG. 6A, the radial displacement increases abruptly at the transition between the respective end fittings and the hose with the braided wire reinforced covering, however, the increase is relatively minor as radial displacement is resisted by the braided wire covering.

Figures 6B, 6C:
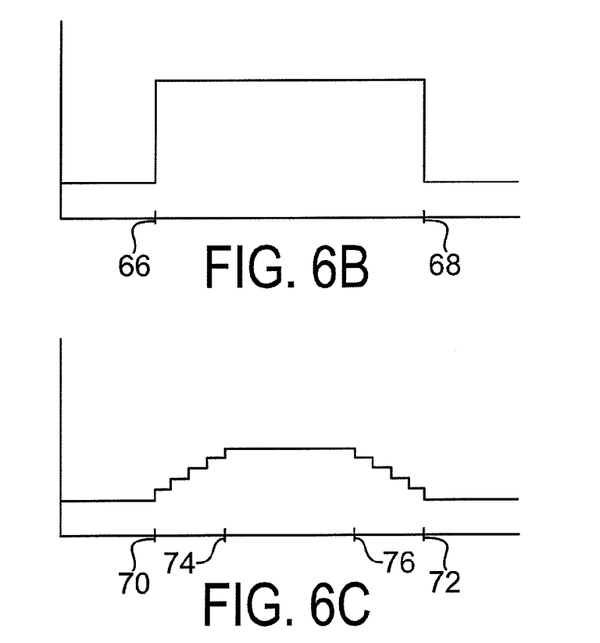

FIG. 6B is a graph illustrating radial displacement for the same predetermined load (Y-axis) over the axial length (X-axis) of a dielectric fitting assembly having a non-reinforced hose section surrounded by only a generally circumferentially wound glass fibre covering. Dashes 66 and 68 on the X-axis mark the transition between the respective end fittings and the hose section with the glass fibre covering adjacent the inner edge of the fittings. As can be seen from a comparison of the graph of FIG. 6A and the graph of FIG. 6B, the radial displacement of the glass fibre is significantly greater than that of the braided wire covering for the same internal force. The abrupt increase in radial displacement at the transition between the respective end fittings and the hose section with the glass fibre covering is undesirable and results in high stresses at the location of the abrupt transitions. The locations of the high stresses in the dielectric fitting assembly are likely locations for a failure, such as a leak, of the dielectric fitting assembly.

Figure 4:
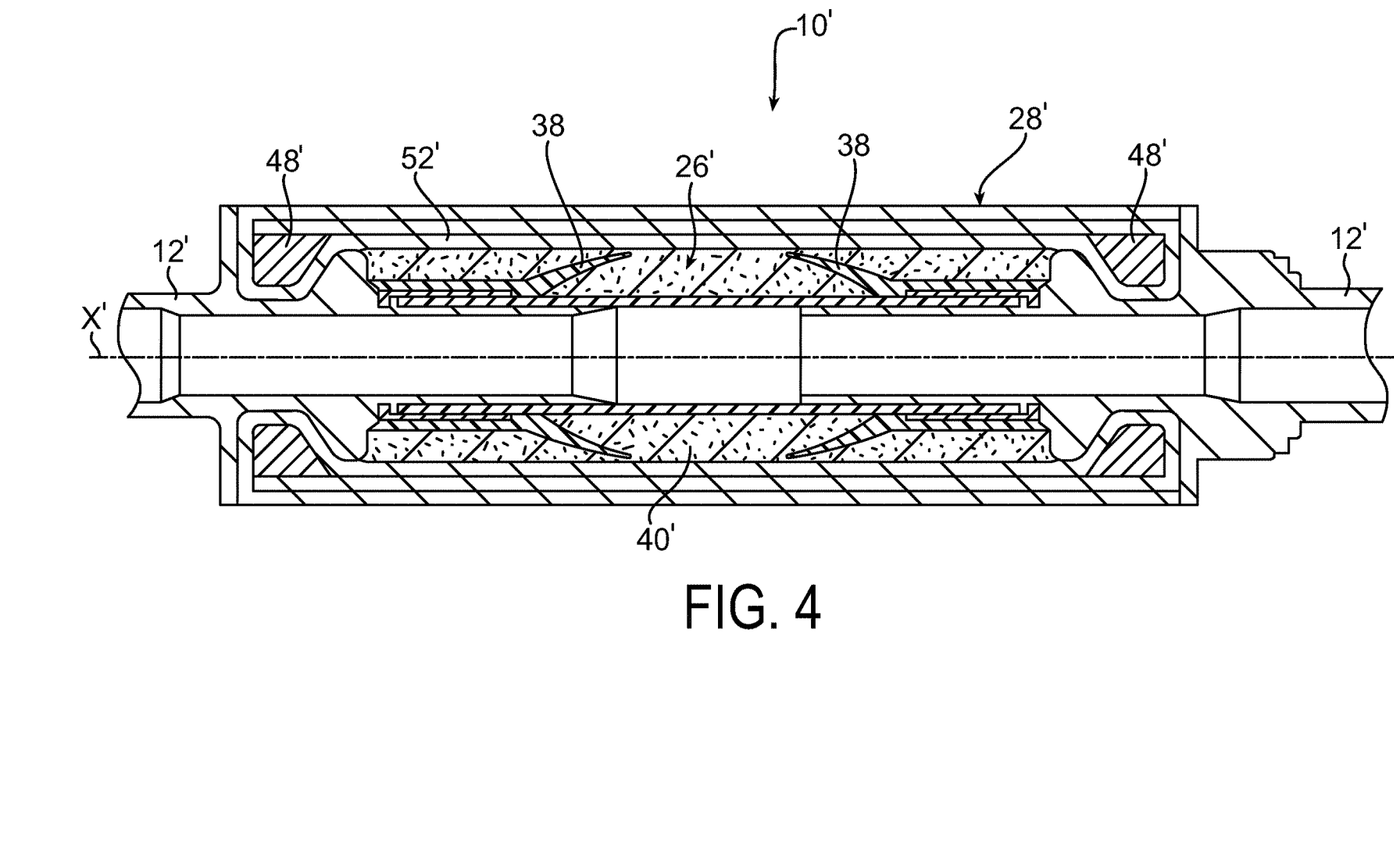
FIG. 4 is a partial cross-sectional view of a dielectric fitting assembly constructed in accordance with another embodiment of the invention.
Figure 6D:
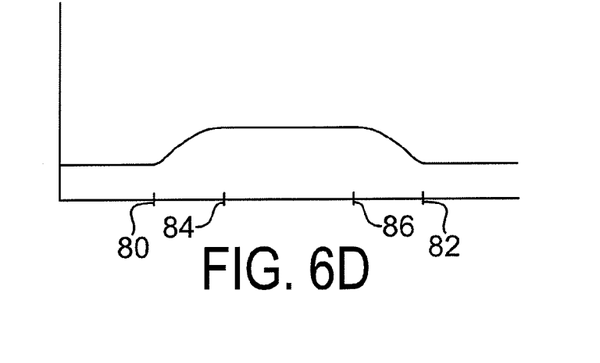

It is important to realize small changes in radial displacement over the axial length of the HRU 10. To minimize undesirable, abrupt changes, such as is illustrated in FIG. 6B, the inner layer 26 of the HRU 10 of the present invention is designed, in one embodiment, with at least two different fibres, each of varying characteristics (such as strength and electrical resistance). For example, the inner layer 26 may comprise both glass fibres and carbon fibres and, the relative differences in strength of these different fibres is utilized to avoid abrupt changes in radial deflection along the axial length of the HRU 10. The socket region at both ends of the crimped assembly 20 is wrapped with the much stronger carbon fibre reinforced plastic (CFRP) and the CFRP extends outwardly from an end of the socket in a manner so that radial deflections transition in a non-abrupt manner to that provided solely by the glass fibres of the inner layer 26. In the embodiment of FIG. 3, this transition in the radial deflections of the inner layer 26 is provided by stepped portions 36 of the CFRP that gradually extend radially outwardly as each step extends away from its associated socket 16. The glass fibre is located both below and above the stepped portions 36. In the embodiment of FIG. 4, the transition in radial deflections of the inner layer 26' is provided by arched (or finger-like) portions 38 that gradually extend radially outwardly relative to the longitudinal axis X' as they extend away from the respective fittings 12'. The physical effect of these designs is a smooth (or relatively smooth) change in the radial deflection along the length of the HRU when a predetermined internal pressure is applied. FIG. 6C is a graph of radial displacement for the predetermined load (Y-axis) over the axial length (X-axis) of the HRU 10 of FIG. 1. In FIG. 6C, dashes 70 and 72 on the X-axis mark the transition at the terminal end of the respective end fittings and dashes 74 and 76 mark the terminal ends of the stepped portions 36 nearest the centre of the HRU 10. FIG. 6D is a graph of radial displacement for a predetermined load (Y-axis) over the axial length (X-axis) of the HRU 10' of FIG. 4. In FIG. 6D, dashes 80 and 82 on the X-axis mark the transition at the terminal end of the respective end fittings and dashes 84 and 86 mark the terminal ends of the arched portions 38 nearest the centre of the HRU 10'.

Both the embodiment of FIGS. 1-3 and the embodiment of FIG. 4 are formed for providing a high electrical resistance between their respective end fittings. The inner layer of each embodiment is formed, according to one example, from both the high strength carbon fibre (CFRP) and the high electrically resistant glass fibres (GFRP). As a result, the HRUs have a high strength and a high electrical resistance. As can be seen in FIGS. 1 and 3, a central portion 40 of the inner layer 26 is rounded (or somewhat toroidal) and is formed from non-conductive GFRP. This non-conductive GFRP central portion 40 separates the conductive stepped portions 36 of CFRP. The distance between the conductive parts on both sides of the HRU 10, i.e., the CFRP, sockets 16 and end fittings 12, may be adjusted to provide for any required dielectrically strength. Similarly, with reference to FIG. 4, a central portion 40' of the inner layer 26' is rounded (or somewhat toroidal) and is formed from non-conductive GFRP. This non-conductive GFRP central portion 40' separates the arched portions 38 of CFRP. The distance between the conductive parts on both sides of the HRU 10', i.e., the CFRP, sockets 16' and end fittings 12', may be adjusted to provide for any required dielectrically strength.

The outer layer 28 is applied after the inner layer 26. The outer layer 28 is formed of non-conductive fibres that are oriented axially or near axially (such as, e.g., within thirty degrees of the axial direction) with respect to the longitudinal axis X of the HRU 10. In one embodiment, the outer layer 28 is formed of non-conductive glass fibres. By being non-conductive, electrical energy is not conducted between the end-fittings 12 through the outer layer 28. The outer layer 28 functions to secure the end-fittings 12 relative to each other in the axial direction. The method by which load transfer is achieved between the composite outer layer 28 and the metallic end-fittings 12 is based on the teachings of copending U.S. patent application Ser. No. 12/677,159, which is incorporated herein by reference in its entirety. In this method, composite material with the desired axial (or near axial) fibre orientation is laid about the crimped assembly 20 over the inner layer 26 and beyond the end-fittings 12. Once the desired coverage and thickness of axial (or near axial) fibres is achieved, a band 48 (FIG. 1) of composite material is wrapped circumferentially about the axial fibres at a location that coincides with a recess feature in the end-fitting 12. The wrapping of the band 48 causes the axial fibres to be pressed into a locking relationship with the recess feature of the fitting 12. The operation is repeated at the location of the recess feature of the other end-fitting 12, and then the ends of the axial (or near axial) composite material are folded back over the band 48 and over the innermost ply 52 of the outer layer 28. The folded back material may be secured by applying a circumferential layer of composite material (not shown). In the embodiment illustrated in FIG. 1, the material is folded back as far as possible to produce an outer layer 28 which is formed of three plies and thus, is three times thicker than the original ply 52 of the outer layer 28. The three plies help to maximize the axial stiffness of the outer layer 28.

The outer layer 28' of FIG. 4 is formed in a manner similar to that described above with reference to FIG. 1. In FIG. 4, the inner ply is indicated by reference numeral 52' and, the circumferential bands are indicated by reference numeral 48'.

Figure 5:
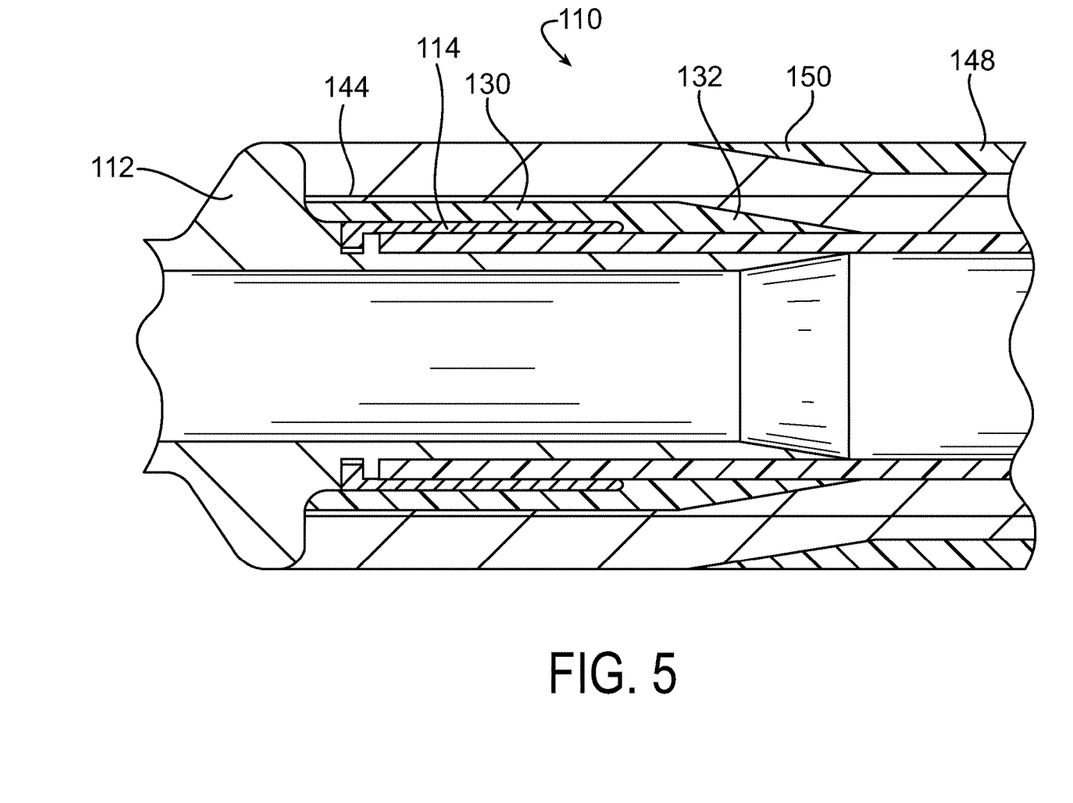
FIG. 5 is a cross-sectional view of a portion of a dielectric fitting assembly constructed in accordance with yet another embodiment of the invention.

FIG. 5 illustrates a partial cutaway view of yet another embodiment of an HRU 110 constructed in accordance with the present invention. FIG. 5 is a cross-sectional view illustrating only a portion of one end-fitting 112 with its associated socket 114 holding an end of the hose section 116 and the inner layer 126. The outer layer is not illustrated in FIG. 5 but would be similar to that described with reference to FIGS. 1 and 4. The inner layer 126 includes a high modulus carbon fibre wrapped portion 130 located so as to overlay the socket 116. The high modulus carbon fibre wrapped portion 130 includes a tapered (or narrowing) end 132 at a location spaced away from the socket 116. A relatively uniform thickness portion of high electrically resistant material, such as glass fibre (or alternatively Aramid or other suitable material), indicated at reference numeral 140 overlies the high modulus carbon fibre wrapped portion 130. An electrically conductive film 144, formed from a material such as a conductive polyimide (such as that sold under the trade mark Kapton by DuPont) or such as that sold by DuPont under the trade mark Nomax, may be embedded in the layer of glass fibre for specifically controlling the electrical resistance between the end fittings 112 of the HRU 110. Another high modulus carbon fibre wrapped portion 148 completes the inner layer 126. This high modulus carbon fibre wrapped portion 148 also includes tapered ends, one of which is shown at 150, that correspond with the tapered end 132. The tapered ends 132 and 150 provide a smooth transition of the radial displacement of the inner layer 126 and thus, the HRU 110, while the uniform portion 140 provides a high electrical resistance.

Presently preferred embodiments of the invention are shown in the drawings and described above. The invention is not, however, limited to these specific embodiments. Various changes and modifications can be made to this invention without departing from its teachings, and the scope of this invention is defined by the claims set out below.

The invention claimed is:

1. A dielectric fitting assembly comprising:
    an assembly including a hose connected between two end fittings; and
    a structural reinforcement portion having at least an inner layer formed of at least different first and second composite materials and having a high strength portion and a high electrically resistant portion, the first composite material having a high strength relative to the second composite material and the second composite material having a high electrical resistance relative to the first composite material, the first and second composite materials covering the assembly and the high strength portion having axially extending end portions, wherein each end portion extends away from the respective fitting and toward the other and gradually extends radially outward from a longitudinal axis of the fitting providing a smooth transition of radial stiffness as the inner layer transitions from a high strength portion to the high electrically resistant portion.

2. The dielectric fitting assembly of claim 1 in which the inner layer is formed from fibres having a circumferential orientation.

3. The dielectric fitting assembly of claim 1 in which the inner layer is formed from fibres oriented at an angle between 60 and 90 degrees relative to a longitudinal axis of the fitting assembly.

4. The dielectric fitting assembly claim 1 in which the structural reinforcement portion further includes an outer layer having fibres oriented in an axial or near axial orientation.

5. The dielectric fitting assembly of claim 4 in which the outer layer includes folded back portions.

6. The dielectric fitting assembly of claim 1 in which the high strength portion is formed of carbon fibre reinforced plastic.

7. The dielectric fitting assembly of claim 1 in which the high electrically resistant portion is formed of glass fibre reinforced plastic.

8. The dielectric fitting assembly of claim 1 in which each end of the hose is connected to the fittings by a crimped socket; in which the structural reinforcement portion has an outer layer, and in which the first composite material surrounds the socket of each fitting and extends axially toward the other fitting, the second composite material surrounding the first composite material and surrounding the hose at least between the axially extending end portions of the first composite material, the outer layer formed of non-conductive fibres.

9. The dielectric fitting assembly of claim 8 in which the axially extending portions of the first composite material are positioned bending radially outward from a longitudinal axis of the fitting as the portions extend axially from each socket.

10. The dielectric fitting assembly of claim 8 in which the axially extending end portions are tapered.

11. The dielectric fitting assembly of claim 8 in which the inner layer is formed from fibres having a circumferential orientation.

12. The dielectric fitting assembly of claim 8 in which the inner layer is formed from fibres oriented in at an angle between 60 and 90 degrees relative to a longitudinal axis of the fitting assembly.

13. The dielectric fitting assembly of claim 8 in which the first composite material is formed of carbon fibre reinforced plastic.

14. The dielectric fitting assembly of claim 8 in which the second composite material is formed of glass fibre reinforced plastic.

15. The dielectric fitting assembly of claim 1 in which each end of the hose is connected to the fittings by a crimped socket; and in which the structural reinforcement portion has an outer layer, and in which the inner layer is formed of carbon fibre reinforced plastic and glass fibre reinforced plastic, the carbon fibre reinforced plastic surrounding the socket of each fitting and extending axially toward the other fitting, the glass fibre reinforced plastic material surrounding the carbon fibre reinforced plastic and surrounding the hose at least between the axially extending portions of the glass fibre reinforced plastic, in which the axially extending portions of the carbon fibre reinforced plastic are positioned bending radially outward from a longitudinal axis of the fitting as the portions extend axially from each socket.

16. The dielectric fitting assembly of claim 15 in which the outer layer has fibres oriented in an axial or near axial orientation.

17. The dielectric fitting assembly of claim 1, wherein the end portions are stepped.

18. The dielectric fitting assembly of claim 1, wherein the end portions are arched.

* * * * *